Feb. 21, 1950     W. H. WANNAMAKER, JR     2,498,101
CONTROL APPARATUS
Filed Dec. 12, 1945     4 Sheets-Sheet 1

FIG. 1

*INVENTOR.*
WILLIAM H. WANNAMAKER JR.
BY Arthur H. Swanson
ATTORNEY.

Feb. 21, 1950 W. H. WANNAMAKER, JR 2,498,101
CONTROL APPARATUS

Filed Dec. 12, 1945 4 Sheets-Sheet 3

FIG. 3

INVENTOR.
WILLIAM H. WANNAMAKER JR
BY Arthur H. Swanson
ATTORNEY.

Feb. 21, 1950          W. H. WANNAMAKER, JR          2,498,101
                          CONTROL APPARATUS
Filed Dec. 12, 1945                              4 Sheets-Sheet 4

FIG. 4

INVENTOR.
WILLIAM H. WANNAMAKER JR.
BY Arthur H. Swanson
ATTORNEY.

Patented Feb. 21, 1950

2,498,101

UNITED STATES PATENT OFFICE 2,498,101

CONTROL APPARATUS

William H. Wannamaker, Jr., Flourtown, Pa., assignor, by mesne assignments, to Minneapolis-Honeywell Regulator Company, Minneapolis, Minn., a corporation of Delaware Application December 12, 1945, Serial No. 634,557

14 Claims. (Cl. 318—29)

The general object of the present invention is to provide an improved electrical control apparatus which is of the proportioning type and includes means for automatically effecting reset adjustments. A more specific object of the invention is to provide an electric proportioning apparatus with novel and effective means for automatically making reset adjustments which vary in magnitude and rate with the magnitude of the variations in the control quantity or condition which create the need for the reset adjustments.

A primary and practically important object of the invention is to provide a simple and effective control apparatus of the type specified, in which the motor used to actuate such a relatively high powered, slow moving mechanism as is required to position a control valve in response to potentiometer measurements, may be controlled by electromagnetic relays having their coils actuated by the output currents of electronic valves. Such a control apparatus is adapted to give long life and dependable service and is inherently substantially less costly than arrangements in which the drive motors have their windings directly energized by the output currents of electronic valves.

My improved control apparatus is characterized by its provisions through which a desirable motor damping action is obtained by making the relay energizing currents dependent both upon the magnitude and upon the rate of change of the deviation of the actual value of the controlling condition or quantity from its normal or control point value. With my improved control apparatus it is neither desirable nor practically feasible to attain final balance through a substantial coasting movement of the rebalancing motor, and in its preferred form my improved control apparatus includes relay circuit damping means which directly contribute to the attainment of final balance in a plurality of short adjustment steps.

Another practically important object of the invention is to provide improved means for operating the reversible reset motor of an electrical control apparatus of the proportioning type, and in particular to provide simple and effective means for operating that motor at a speed automatically increasing and decreasing through a substantially wide range as the extent of deviation of the control quantity from the normal value thereof increases and decreases.

Another important object of the invention is to provide simple and effective means for interrupting or modifying normal operation of the reset motor in automatic response to certain special control conditions. In particular, it is an object of the invention to provide means preventing operation of the reset motor in the initial portion of a furnace heating operation in which the furnace is being heated up to its working temperature and actuated on the attainment of said working temperature to initiate operation of the reset motor.

A further object of the invention is to provide a control apparatus of the general type specified, including relay energizing duplex electronic valve units adapted for alternating current energization with full wave power output, and including simple and effective means for energizing, and damping the operation, of said units in selective response to variations in an alternating current signal.

Another object of the invention is to provide a novel amplifying circuit arrangement which will fail safely as a result of the failure or removal of one or more of a plurality of electronic valve elements of said arrangement.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Figure 1:
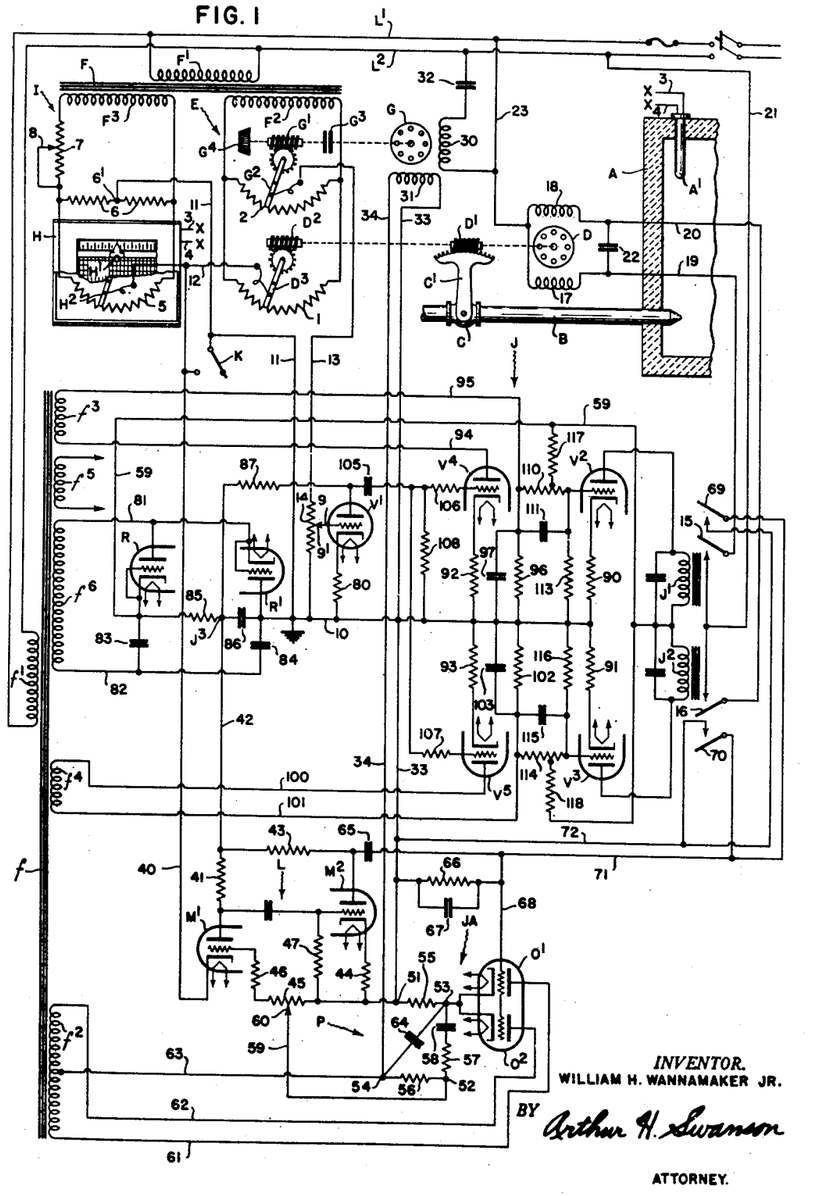
Fig. 1 is a diagrammatic representation of one form of my improved control apparatus.

In Fig. 1 I have illustrated an embodiment of the present invention arranged for use in controlling the temperature in a furnace A which is heated by the combustion of fluid fuel supplied through a fuel supply pipe B at a rate regulated by the adjustment of a feed valve C.

As diagrammatically shown, the adjustment of the valve C is effected by the oscillation of a valve member C' which comprises a gear segment having its gear teeth engaged by a worm D' rotated by a reversible electric valve motor D. The shaft of the motor D carries a second worm $D^2$ in mesh with teeth of a gear segment portion of a contact member $D^3$. The rotative movements of the motor D which adjust the valve C through the worm D', operate through the worm D² to effect corresponding follow-up adjustments of the contact D³ along the slide wire resistance 1 of a valve bridge circuit E, in the usual electric proportioning apparatus manner. The valve bridge circuit E is shown as energized by secondary winding F² of a transformer F having its primary winding F' connected to alternating current supply conductors L1 and L2. The slide wire resistance 1 is connected to the energizing winding F² in parallel with a slide wire resistance 2.

The control apparatus shown in Fig. 1 comprises a reversible reset motor G, the shaft of which carries a worm G' in mesh with gear teeth on the hub portion of a contact arm G², which is adjusted along the resistor 2 when the motor G is operated as hereinafter described.

As shown in Fig. 1, the control temperature of the furnace A is measured by means of a thermocouple A' having its terminals connected by conductors 3 and 4 to the terminals of an instrument H. To simplify illustration, the conductors 3 and 4 are partly broken away in Fig. 1. The instrument H may well be, and as shown, is a recording potentiometer controller of known type including a marking element H' and a pivoted contact arm H². The marking element H' and pivoted contact arm H² are each adjusted by the instrument as the thermocouple voltage varies.

The contact arm H² engages the slide wire resistance element 5 of an instrument bridge circuit I. The circuit I includes a resistance 6 connected in parallel with the slide wire resistance 5 to the bridge energizing winding F³. The latter is a secondary winding of the transformer F. As shown, one terminal of the winding F³ is connected to the corresponding ends of the resistances 5 and 6 through a resistance 7 more or less of which may be short circuited by a shunt 8 to thereby vary the throttling range of the control apparatus, as hereinafter described.

Whether the control apparatus shown in Fig. 1 operates as an automatic system or as a manual control system depends on whether a switch K is in its right hand or in its left hand position. In the automatic control condition of the switch K shown in Fig. 1, the output terminals of the valve bridge E and of instrument bridge I are connected in series with one another to the input terminals 9 and 10 of an electronic amplifier apparatus J. As shown the terminal 10 is a grounded conductor. The output terminals of the two bridges are thus connected to the amplifier by conductors 11, 12 and 13 and a relatively high resistance 14. The conductor 11 connects the grounded amplifier terminal 10 to the resistance 6 at an intermediate point 6', shown as midway between the ends of said resistance. The conductor 12 connects the contact H² of the instrument bridge I to the contact D³ of the valve bridge E. The conductor 13 connects the reset contact G² to one end of a resistance 14. The other end of the resistance 14 is connected to ground, and the amplifier terminal 9 terminates in a contact 9' in sliding engagement with a portion of the resistance 14 adjacent the conductor 13. The adjustment of the contact 9' along the resistance 14 varies the sensitivity of the control system as may be required to obtain the best control results under the prevailing operating conditions.

Depending upon conditions of operation hereinafter explained, the signal impressed on the input terminals 9 and 10 of the amplifier J may be of one or the other of two phases which are displaced from one another by 180 degrees. When the impressed signal is of one phase, the amplifier J operatively energizes a relay winding J' and thereby closes a normally open relay switch 15. When the control signal is of the second phase, the second relay winding J² of the amplifier J is energized with the result of closing the normally open relay switch 16.

In the arrangement diagrammatically shown in Fig. 1 the closure of the switch 15 energizes the valve motor D for operation in one direction, and the closure of the switch 16 energizes the motor for operation in the reverse direction. The motor D shown is an alternating current motor of well known type having a squirrel cage rotor and two field windings 17 and 18. One terminal of the field winding 17 is connected to the switch 15 by a conductor 19 and one terminal of the field winding 18 is connected to the switch 16 by a conductor 20. Each of the switches 15 and 16, when in its closed position, is connected to the alternating current supply conductor L2 by a conductor 21. The terminals of the field windings 17 and 18 which are respectively connected to the conductors 19 and 20, are also connected by a condenser 22. The other terminals of the windings 17 and 18 are connected to the alternating current supply conductor L1 by a conductor 23.

The condenser 22 causes the alternating currents flowing in the field windings 17 and 18 to be displaced in phase relative to one another in one direction when the movable switch contact 15 is closed, and in the opposite direcon when the movable switch member 16 is closed. With each switch member in its open position, no currents flow through the windings 17 and 18 and the motor stalls. With the phase of one current displaced relative to the phase of the other, the two currents create a rotating field, which rotates and thereby causes the rotor of the valve motor D to rotate in one direction or the other, depending on the direction of phase displacement of the two currents.

The reset motor G is also an alternating current motor of known type having a squirrel cage rotor and two windings 30 and 31 which coact to create a magnetic field rotating in one direction or the other on the development of a difference in potential between the instrument contact H² and the intermediate point 6' of the resistance 6. The field winding 30 of the motor G has one terminal connected to the conductor 23 and thereby to the supply conductor L1, and has its second terminal connected to the supply conductor L2 through a condenser 32. The condenser 32 and winding 30 are so proportioned that the current flow through the winding 30 leads the alternating voltage of the supply conductors L1 and L2 by approximately 90 degrees. Field winding 31 of the motor G has its terminals connected by conductors 33 and 34 to energizing means for causing a current flow through the winding, when contact H² and point 6' differ in potential, which is approximately in phase with the voltage between the supply conductors L1 and L2, or is approximately 180 degrees out of phase with the last mentioned voltage, depending upon whether the contact H² or the point 6' has the higher voltage.

The energizing means for the winding 31 comprises an amplifier L, including the first and second stage voltage amplifying triodes M' and M², respectively, and comprises a motor drive section or stage JA including triodes O' and O², and comprises a bridge circuit P associated with the motor drive section JA. The bridge circuit P provides a feed-back action from the motor drive stage JA to the input circuit of the first stage amplifying triode M', which causes the speed of rotation of the reset motor G to vary in accordance with the extent of departure of the slider contact $H^2$ from its normal or control point position through a speed range which is much greater than the motor would have if the bridge circuit P with its feed-back action was not used.

The instrument slider contact $H^2$ is connected to the cathode of the triode M' through the conductor 12 and a conductor 40. The anode of the triode M' is connected through a resistance 41 and conductor 42 to a terminal point $J^3$ in the circuit network of the amplifier J. As is hereinafter explained, the potential of the point $J^3$ is maintained positive and approximately constant relative to that of the grounded conductor 10 included in the network of amplifier J. The terminal point $J^3$ is also connected through the conductor 42 and a resistance 43 to the anode of the triode $M^2$. The cathode of the triode $M^2$ is connected through a resistance 44 to the junction point 51 of the bridge P. Said junction point 51 is also connected through resistances 45 and 46 to the control grid of the triode M' and through a resistance 47 to the control grid of the triode $M^2$. The junction 51 and the conjugate junction 52 form the output terminals, and the junctions 53 and 54 form the input terminals of the bridge P.

The reset motor winding 31 forms the arm of the bridge P which extends between the junctions 51 and 54 to which the conductors 33 and 34 are respectively connected. As shown, the conductor 33, and thereby the bridge junction 51, are connected to the grounded conductor 10 of the amplifier J. The arm of the bridge connecting the junctions 51 and 53 includes a resistance 55. The bridge arm connecting the junctions 52 and 54 includes a resistance 56, and the bridge arm extending between the junctions 52 and 53 includes a resistance 57 and a condenser 58. The previously mentioned feed back connection comprises a conductor 59 connected at one end to bridge junction 52, and at the other end to a slider contact 60. The latter engages and is adjustable along the resistance 45 to thereby vary the rate of reset.

The bridge P is energized by a source of alternating voltage which, as shown, comprises the secondary winding $f^2$ of a transformer $f$ having its primary winding $f'$ connected to and energized by the supply conductors L1 and L2. Two transformers, F and $f$, are shown in Fig. 1 for convenience of illustration. In ordinary practice, they would be replaced by a single transformer. The transformer secondary winding $f^2$ has its end terminals connected by conductors 61 and 62 to the anodes of the triodes O' and $O^2$, respectively. The winding $f^2$ has a center tap connected by conductor 63 to the bridge input terminal 54. The other input terminal 53 of the bridge is connected to the cathodes of the triodes O' and $O^2$. A condenser 64 is connected between the bridge junctions 53 and 54. The output circuit of the amplifier triode $M^2$ is resistance capacity coupled to the input circuit of the triodes O' and $O^2$ by means including a condenser 65 and a parallel connected resistance 66 and condenser 67. The condenser 65 is connected by a conductor 68 to the control grids of both triodes O' and $O^2$, and is connected to the cathodes of those triodes by means of the parallel connected resistance 66 and condenser 67, and the biasing resistance 55.

In the apparatus shown in Fig. 1, operation of the reset motor G during the periods in which the valve motor D is in operation, is prevented by means including relay switches 69 and 70, which are closed by the energization of the relay winding J' and $J^2$, respectively. When either of the normally open switches 69 and 70 is closed, it closes a short circuit about the resistance 66 and condenser 67, and thus by-passes the alternating signals which otherwise would be impressed on the reset motor driving stage JA. The short circuiting connections comprise a branched conductor 71 connecting the conductor 68 to each of the switches 69 and 70, and a branched conductor 72 connecting the conductor 33 to stationary contacts respectively engaged by the switches 69 and 70 when the latter are closed. If after the valve motor D moving in either direction has reached the limit of its movement in that direction, the reset motor G operates to unbalance the control system in such manner as to require further movement of the motor D in the last mentioned direction to rebalance the control system, such movement of the motor G quickly builds up the switch closing force of the corresponding relay winding J' or $J^2$, and thus prevents further movement of the motor G.

The bridge P operates when the motor G is in rotation to develop an E. M. F. at its output terminals 51 and 52 which is in phase, or 180 degrees out of phase, with the voltage between supply conductors 61 and 62, depending on the direction of rotation of the motor. The electromotive force so developed increases with the speed of the motor G. With a feed-back connection from the bridge P to the control grid of the triode M' as disclosed, the signal potential difference between the contact $H^2$ and the point 6' required to bring the motor G up to full speed, may readily be increased as much as fifty or sixty times above the signal voltage which would increase the motor speed from substantially zero to full speed if the bridge P with its feed-back connection were not used.

The mode of operation and characteristic of the bridge P need not be further described herein as its use in controlling the speed of a motor in the general manner shown in Fig. 1 did not originate with me and is fully disclosed in the application for patent of Thomas R. Harrison and Lloyd B. Cherry, Serial No. 528,866, filed March 31, 1944. It is noted herein, however, that the bridge P is of a type known in the art as a Hay bridge which includes fixed resistances 55 and 56 in two diametrically opposed arms, and includes capacitance in one and inductance in the second of the other two bridge arms. In the arrangement shown, in Fig. 1 the inductance is that of the motor winding 31, and the capacitance is that of the condenser 58. The value of the condenser 58 is so chosen as to offset, at least to a substantial extent, and if desired, entirely, the effect of the inductance of the motor winding 31, so that when the rotor of the motor G is at rest the bridge network P is substantially balanced. Merely by way of example, it is noted that in one embodiment of the invention in which the motor drive triodes O' and $O^2$ are valves of the 7N7 type, the value of the capacitance 58 is .1 mfd. and the value of the resistances 55, 56 and 57 are 500, 17,000 and 140,000 ohms, respectively.

While for the general purposes of the control apparatus shown in Fig. 1 the amplifier J may take various forms, special advantages are obtained when the amplifier is of the type illustrated in Fig. 1. As there shown, the amplifier comprises triodes R and R' used as rectifiers to provide unidirectional voltage for energizing the plate circuits of a first stage amplifier triode V' and of relay energizing triodes $V^2$ and $V^3$. The output of the triode V' is subject to amplification by one or the other of triodes $V^4$ and $V^5$ depending on the phase of said output. Alternating voltage is supplied to the plate circuits of triodes $V^4$ and $V^5$ by secondary windings $f^3$ and $f^4$, respectively, of the transformer $f$, in such manner that the respective voltages on the plates of the triodes $V^4$ and $V^5$ are 180 degrees out of phase. The terminal 9 of the amplifier J is directly connected to the control grid of the triode V' and the grounded conductor 10, which forms the second terminal of the amplifier J, is connected to the cathode of the triode V' through a resistance 80.

In the arrangement shown, when the triode V' impresses no signal on the control grids of the triodes $V^4$ and $V^5$, those triodes conduct sufficient current to maintain the triodes $V^2$ and $V^3$ substantially non-conductive, so that both relays J' and $J^2$ and then deenergized. On the assumptions made above, a drop in the temperature of the thermocouple A' results in the impression of a signal on the control grids of the triode $V^4$ and $V^5$ of such phase that the control grid of the triode $V^4$ is driven in the negative direction during the half cycle that its plate is positive. The triode $V^4$ then becomes substantially non-conductive with the result that the triode $V^2$ then becomes conductive and energizes the relay winding J'. When a signal of opposite phase is impressed on the control grids of the triodes $V^4$ and $V^5$, the control grid of triode $V^5$ is driven negative during the half cycle that its plate is positive. This makes the triode $V^3$ conductive and effects the energization of the relay winding $J^2$.

As shown, the transformer $f$ includes a secondary winding $f^5$, the purpose of which is to provide heating current to the cathode heating filaments of the various valves R and R', V', $V^2$, $V^3$, $V^4$ and $V^5$. The rectifier triodes R and R' are energized by alternating current supplied by a secondary winding $f^6$ of the transformer $f$. One terminal of the winding $f^6$ is directly connected through a conductor 81 to the anode of the triode R, and to the cathode of the triode R' and to the control grid of the triode R'. The second terminal of the transformer secondary $f^6$ is connected by a conductor 82 to one terminal of each of condensers 83 and 84. The second terminal of the condenser 83 is connected to the cathode of the rectifier triode R, and the second terminal of the condenser 84 is connected to the anode of the triode R'. The cathode of triode R is connected through a resistance 85 and a condenser 86 to the anode of the triode R'. The connected terminals of the resistance 85 and condenser 86 are connected by a resistance 87 to the anode of the amplifier triode V'. As previously explained, the cathode of the triode V' is connected through resistance 80 to the grounded conductor 10, and through the latter is connected to the condenser 84 and the anode of the triode R'.

As will be apparent, the transformer secondary $f^6$, the valves R and R' and the condensers 83 and 84 form a so-called voltage doubler circuit which supplies suitably high D. C. voltage to the plate circuits of the triodes $V^2$ and $V^3$. The negative terminal of the doubler is connected by the conductor 10 and resistances 90 and 91 to the cathodes of the triodes $V^2$ and $V^3$, respectively. The positive terminal of the doubler is connected by the conductor 59 to the connected terminals of the relay coils J' and $J^2$ which have their outside terminals connected to the anodes of the triodes $V^2$ and $V^3$, respectively.

The conductor 10 is also connected directly to the anode of triode R', and is connected through resistances 92 and 93 to the cathodes of the triodes $V^4$ and $V^5$, respectively. One terminal of the transformer secondary $f^3$ is connected to the anode of the triode $V^4$ by a conductor 94, and the other terminal of the secondary $f^3$ is connected by a conductor 95 and by a resistance 96 and a condenser 97 in shunt with resistance 96 to the conductor 10, and is thereby connected through the resistance 92 to the cathode of the triode $V^4$. One terminal of the transformer secondary $f^4$ is connected by a conductor 100 to the anode of the triode $V^5$, and the other terminal of the secondary $f^4$ is connected by a conductor 101 and a resistance 102 and a condenser 103 in parallel with the resistance 102 to the conductor 10, and thereby connected through the resistance 93 to the cathode of the triode $V^5$.

The output circuit of the triode V' is coupled to the input circuits of the tubes $V^4$ and $V^5$ by means including a condenser 105 which has one terminal connected to the anode of the tube V'. The other terminal of the condenser 105 is connected to the control grid of the tube $V^4$ through a resistance 106 and is connected to the control grid of the tube $V^5$ through a resistance 107, and is connected through a resistance 108 to the conductor 10. The conductor 10, as previously explained, is connected to the cathode of triode V' by the resistance 80, and is connected to the cathodes of triodes $V^4$ and $V^5$ by the resistances 92 and 93, respectively.

In addition to the resistance 96 and condenser 97, the coupling connection between the output circuit of the triode $V^4$ and the input circuit of the triode $V^2$ includes a resistance 110 and a condenser 111 connected in parallel with said resistance between the conductor 95 and the control grid of the triode $V^2$. Said control grid is also connected through a resistance 113 to the conductor 10 and thereby through the resistance 90 to the cathode of the triode $V^2$. Similarly, the output circuit of the triode $V^5$ is connected to the input circuit of the triode $V^3$ by coupling means including the previously mentioned resistance 102 and condenser 103, and also including a resistance 114 and condenser 115 in parallel with said resistance which connect conductor 101 to the control grid of the triode $V^3$. That control grid is also connected by a resistance 116 to the conductor 10 and thereby through resistance 91 to the cathode of the triode $V^3$.

As shown, separate by-pass condensers are connected in shunt to the relay windings J' and $J^2$. The connected terminals of the windings J' and $J^2$ are connected through conductor 59 and resistances 117 and 118, respectively, to the control grids of valves $V^2$ and $V^3$. As shown, the resistances 117 and 118 are connected to said control grids through small portions of resistances 110 and 114, respectively.

As previously stated, when no signal is impressed on the control grids of the triodes $V^4$ and $V^5$, both triodes conduct sufficient current so that the voltage drops through the resistances 96 and 102 lower the potentials of the control grids relative to the cathode potentials of the valves $V^2$ and $V^3$, respectively, so that the triodes $V^2$ and $V^3$ are then practically non-conductive. In consequence, the relay windings $J'$ and $J^2$ are then deenergized. When a signal of the proper phase is impressed on the control grid of triode $V^4$, the potential of that control grid is driven in the negative direction during the half cycle in which the corresponding anode is positive, so that the triode $V^4$ is then non-conductive. The resultant reduction in plate current of the triode $V^4$ by reducing the potential drop in the resistance 96, permits a plate current flow through the triode $V^2$ which energizes the relay winding $J'$. The relay winding $J^2$ is similarly energized when a control signal of proper phase is impressed on the control grid of the valve $V^5$ with the result of reducing the potential drop in the resistance 102 and thus making the triode $V^3$ conductive.

The described coupling circuit connections between the output circuits of the triodes $V^4$ and $V^5$ and the input circuits of the triodes $V^2$ and $V^3$, respectively, serve the purpose of causing the relay windings $J'$ and $J^2$ to be deenergized at the instant that the control circuit is rebalanced or even during the period in which its rebalance is being effected but has not been completed. The described coupling connections accentuate the effect of both a rising and a falling signal voltage on the input circuits of the triodes $V^2$ and $V^3$. Consider, for example, the action which occurs when following a load change which makes the valve $V^4$ practically non-conductive and makes the valve $V^2$ conductive, the system again approaches balance and current begins to flow in the output circuit of the tube $V^4$. As that current builds up, the resistance 96, the condenser 97 in parallel therewith, the condenser 111, and the associated resistances 110 and 113 connected to the control grid of the valve $V^2$, coact to expedite the rate at which the potential of said control grid becomes increasingly negative relative to the cathode of the valve $V^2$.

As the control apparatus approaches balance, the coupling connections between the valves $V^4$ and $V^5$ and valves $V^2$ and $V^3$, respectively, operate not only to increase the rapidity with which the control grid of one of the valves $V^2$ and $V^3$ becomes increasingly negative relative to the corresponding cathode, but also to make the control grid of the other valve more positive relative to the cathode of that valve. It is possible by a suitable selection of circuit component values not only to deenergize the previously energized relay $J'$ or $J^2$, but also to momentarily energize the other of those relays, prior to the complete rebalancing of the control system. The momentary energization of the other relay as just described, energizes the control motor for operation in the reverse direction and thereby subjects the motor to a positive braking action practically eliminating the tendency of the motor to coast.

The action of the valve coupling provisions just described contributes to a reduction in the length and increase in the number of the individual adjustment steps effected, as balance of the control system is approached, following the unbalancing of the system by a load change. As those skilled in the art will recognize, the reduction in the individual magnitude of the final rebalancing adjustment steps contributes to efficient control by reducing the tendency to over-travel, and objectionable dead zone effects.

In addition to its operating advantages, the amplifier arrangement including the tubes $V'$—$V^5$ has the practically important safety advantage that if any one of the tubes of the amplifier should fail or be withdrawn from its socket, no objectionable motor operation will result. As previously explained, the triodes $V^4$ and $V^5$ are normally conductive, the triodes $V^2$ and $V^3$ are normally non-conductive, and the relay windings $J'$ and $J^2$ are normally deenergized. Ordinarily, triodes $V^2$ and $V^3$ will be contained in the same bottle and if that bottle is withdrawn from its socket no relay or motor operation will result. Furthermore, if the triodes $V^2$ and $V^3$ are in separate bottles, the withdrawal of either bottle from its socket or the failure of the triode therein, can produce no objectionable operation since that triode is normally inoperative.

If the pre-amplifier tube $V'$ should fail, no energization of either relay winding $J'$ or $J^2$ and hence no operation of either motor D or G will result, because the triodes $V^2$ and $V^3$ are normally non-conductive.

With triodes $V^4$ and $V^5$ contained in the same bottle, the withdrawal of the bottle from its socket will not result in motor operation, since both of the triodes $V^2$ and $V^3$ will then be conductive and both relay windings $J'$ and $J^2$ will be energized and this results in motor energization for operation in each direction and thus prevents motor operation in either direction. Further, if one only of triodes $V^4$ and $V^5$ should fail or be removed, the corresponding tube $V^2$ or $V^3$ will be rendered conductive and the corresponding relay winding $J'$ and $J^2$ will then be energized and cause motor operation in one direction. However, such motor operation unbalances the control circuit in the proper direction to cause the other triode $V^5$ or $V^4$ to become non-conductive and thereby to cause the other triode $V^3$ or $V^2$ to become conductive. When this occurs both relay windings $J$ and $J^2$ are simultaneously energized so that both windings of motor D are energized and the motor is thereby stalled.

When the switch K of Fig. 1 is adjusted into its manual control position, it connects the conductor 11 to the conductor 40 and thus eliminates the potential difference between the conductor 40 and the ground conductor 10. This renders the reset motor G inoperative and prevents the instrument bridge I from subjecting the motor D to any control action. With the switch K in its manual control position, the temperature of the furnace thermocouple $A'$ may be regulated by manual adjustment of the contact $G^2$ along the slide wire resistor 2. Following each such adjustment of the slider contact $G^2$, the motor D operates in the manner characteristic of a simple electrical proportioning system to adjust the valve C and to simultaneously adjust the slider contact $D^3$ until the bridge E is rebalanced.

To facilitate the manual adjustment of the contact $G^2$, the worm $G'$ is connected to the rotor of the reset motor by a friction clutch $G^3$, and the worm $G'$ is provided with a knob $G^4$, for use in manually rotating the worm to thereby adjust the contact $G^2$, without rotation of the motor G. The clutch $G^3$ and knob $G^4$ form means also by which corrective adjustments in the position of the contact $G^2$ may be made from time to time, as conditions make them desirable, while the system is in its automatic control condition. The friction clutch $G^3$ may also serve as an overriding or safety clutch to permit the rotation of the worm $G'$ to be interrupted when the contact $G^2$ reaches the limit of its range of movement although the motor G continues in operation in the direction tending to move the contact $G^2$ beyond the limit of its movement.

The general operation of the apparatus shown in Fig. 1 will be readily apparent from the foregoing description. In normal operation with the temperature of the thermocouple A' at its desired value and the control system stabilized, the instrument contact H² will be in its intermediate or control point position, the adjustment of the valve C will be that required to maintain the furnace temperature with the existing furnace load, the position of the contact D³ will correspond to the adjustment of the valve C, and the position of the reset contact G² will be that required to make the potential of that contact the same as the potential of the contact D³. In consequence, the conductors 11 and 13 will then impress no signal on the amplifier J, and neither of the motors D and G will be operatively energized. When thereafter the furnace temperature increases or decreases, the instrument contact H² will move to the right or to the left, respectively. This will unbalance the control circuit and impress a control signal on the amplifier input terminals 9 and 10. The phase of that signal will be approximately the same as the voltage phase of the supply conductors L1 and L2, or approximately 180° out of phase with that voltage, depending on whether the contact H² has moved away from its neutral position to the right or to the left.

Depending on the phase of the signal, the relay winding J' or J² will be energized and thereby start the valve motor D into operation. As previously assumed, when the control signal results from a decrease in the furnace temperature, the relay J' is energized and the motor D operates in the direction to give an opening adjustment to the valve C. When the control signal results from an increase in the furnace temperature the motor D operates in the direction to give a closing adjustment to the valve and to give a corresponding adjustment to the contact D³ along the bridge resistance 1.

Figure 2:
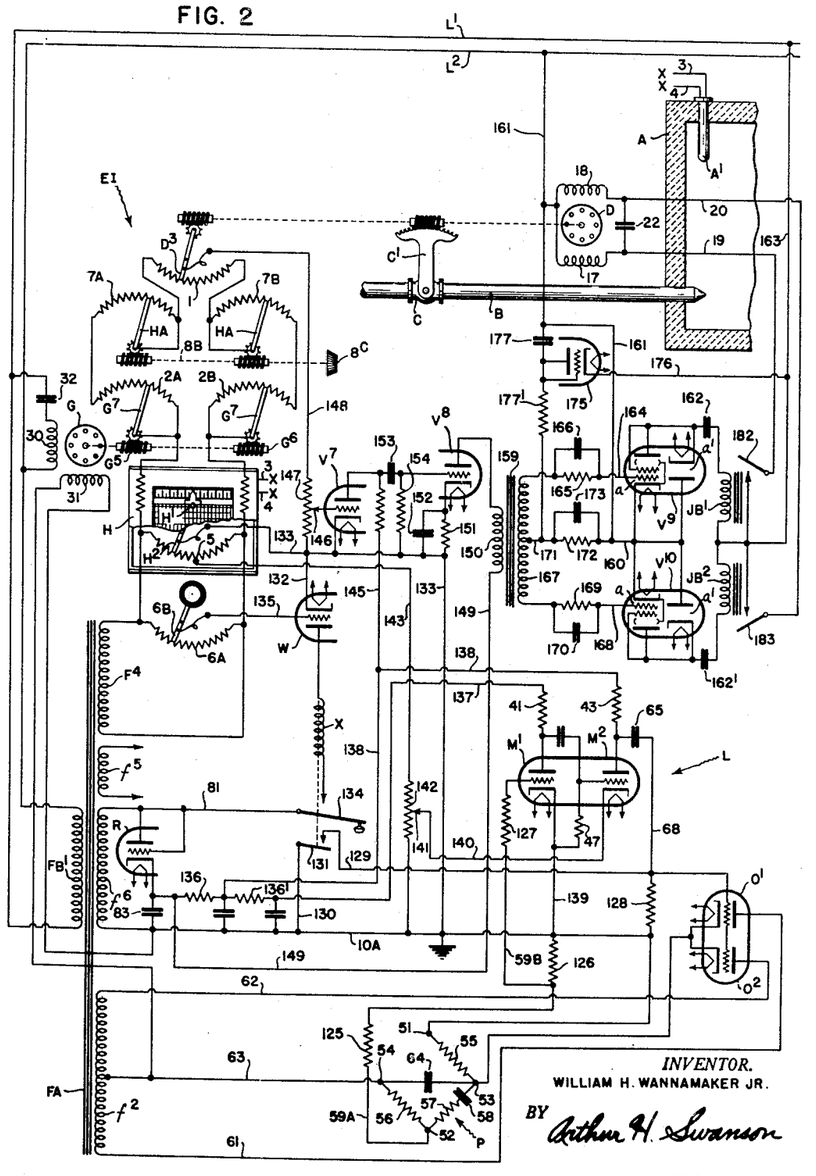
Figs. 2 and 3 are diagrammatic representations of separate modifications of the control apparatus shown in Fig. 1.

The general principles of the invention illustrated in Fig. 1 are not restricted to use in a control apparatus having separate valve and instrument bridge circuits, and in Fig. 1 I have shown by way of example, an embodiment of the present invention in a general principles of the present invention in a control apparatus comprising a single bridge circuit and associated means for operating valve and reset motors D and G in the same general manner in which those motors are operated in the Fig. 1 arrangement. In Fig. 2, however, the open contact relays J' and J² of Fig. 1 are replaced by relays JB' and JB² which may be mercury switch relays with the associated relay energizing means of the type disclosed in my prior application, Ser. No. 541,576, filed June 22, 1944.

The apparatus shown in Fig. 2 also includes means comprising an electronic valve W which keeps the reset motor G inoperative during an initial portion of a furnace heating operation in which the furnace temperature is below a predetermined value which may be slightly below the control point value and to make the reset motor operative when said predetermined temperature is attained.

The single bridge circuit EI shown in Fig. 2, comprises a resistor 1 and associated contact D³ adjusted by the valve motor D, an instrument resistor 5 with an associated contact H² actuated by the instrument H and a resistor 6A connected in parallel to the resistor 5. In the bridge EI one terminal of the resistor 1 is connected to corresponding terminals of the resistors 5 and 6A by a variable reset resistance section 2A, and a variable resistance section 7A in series with the resistance 2A, the resistance 7A being provided for throttling range adjusting purposes. The other terminal of the resistor 1 is connected to the corresponding terminals of the resistors 5 and 6A by a variable reset resistance section 2B and a variable throttling range adjustment resistance 7B, the sections 2B and 7B being respectively similar to the sections 2A and 7A.

In Fig. 2, the shaft of the reset motor G carries worms G⁵ and G⁶, each of which engages and is adapted to rotate the gear hub portion of a corresponding contact G⁷. The contact G⁷ adjusted by the worm G⁵ varies the amount of resistance 2A in the bridge circuit, and the contact G⁷ adjusted by the worm G⁶ operates to increase or decrease the amount of resistance 2B in circuit, as the amount of resistance 2A in the circuit is decreased and increased, respectively. The amounts of the resistances 7A and 7B in circuit are simultaneously adjusted in the same direction by means of slider contact arms HA having gear hub portions engaged by worms carried by a shaft 8B provided with a knob 8C for manual rotation. The resistor 6A is engaged by a contact arm 6B subject to manual adjustment to change its position along the resistor 6A. Its adjustment does not affect bridge balance. The bridge EI is energized by alternating current supplied by the secondary winding F⁴ of a transformer FA which has its primary winding FB¹ connected to alternating supply conductors L1 and L2.

The energizing means for the motor G of Fig. 2 are generally like and include many of the circuit elements of the energizing means shown in Fig. 1, but there are some differences in the connections between the bridge P and the amplifier L and in the energizing and control means for that amplifier. In Fig. 2 the terminal 52 of the bridge P is connected by a conductor 59A and resistances 125 and 126 in series with one another and said conductor to the conductor 10A which is connected to one terminal of the transformer secondary f⁶ and corresponds generally to the conductor 10 of Fig. 1. The junction of the resistances 125 and 126 is connected by the conductor 59B and a resistance 127 to the control grid of the amplifier triode M'. In Fig. 2 the conductor 68 connecting the condenser 65 to the control grids of the triodes O' and O² is connected to the conductor 10A by a resistance 128 which is short circuited when the previously mentioned valve W operatively energizes an associated relay X. The short circuit when closed about the resistance 128 comprises conductors 129 and 130 and a switch member 131 which connects said conductors when the triode W energizes the relay X. When resistance 128 is thus short circuited, the alternating signal which the amplifier L might otherwise impress on the triodes O' and O² is by-passed and prevented from causing operation of the motor G.

The cathode of the triode W is connected by conductors 132 and 133 to one terminal of the transformer secondary f⁶. The anode of the triode W is connected to one end of the winding of relay X. The other end of that winding is connected by switch 134 to the conductor 81 and thereby to the second terminal of the transformer secondary f⁶, when the switch 134 is in its closed position. The switch 134 is mechanically connected to the switch 131 and both switches are gravitationally biased for movement into their lower positions. When the switch 134 is manually raised to connect the lower end of the winding of relay X to the conductor 81, the relay X will be energized if the potential of the control grid of triode W is then such as to make the tube W operatively conductive. When the relay X is energized, it acts as a hold-in relay to maintain the switch members 131 and 134 in their upper closed positions so long as the triode W is operatively conductive. The triode W which is a phase sensitive device, has its input terminals connected between the previously mentioned contacts $H^2$ and 6B of the bridge EI, the control grid of the triode W being connected by a conductor 135 to the contact 6B and the cathode of the triode W being connected through conductors 132 and 133 to the contact $H^2$.

When it is desired to start a heating operation in the furnace A without operation of the reset motor G until a certain furnace temperature is attained the contact 6B is adjusted along the resistance 6A to a position at which its potential is the same as that which the instrument contact $H^2$ will have when its position corresponds to the temperature of the thermocouple A' at which it is desired to have reset operation begin. The switch 134 is then closed. During the initial heating operation the potential of the contact $H^2$ is below the potential of the contact 6B and the signal voltage impressed on the termnals 133 and 135 of triode W is substantially in phase with the potential then impressed on the plate circuit of the triode W so that the latter is then operatively conductive. When the furnace heats up sufficiently so that the potential of the contact $H^2$ exceeds the potential of the contact 6B, the phase of the signal voltage impressed on the terminals 133 and 135 is shifted 180° whereupon the tube W ceases to be operatively conductive. This deenergizes the relay winding X and permits the switch members 134 and 131 to move under gravitational bias into their lower positions. Downward movement of the switch 131 breaks the short circuit about the resistance 128 whereupon the tubes O' and $O^2$ become operatively conductive when a suitable signal voltage is transmitted to their control grids by the amplifier L.

The transformer secondary $f^6$ and triode R supplying unidirectional current to the plate circuits of the triodes M' and $M^2$ and to the plate circuits of amplifying triodes $V^7$ and $V^8$ through which the valve motor D is energized. As shown, the cathode of the triode R is connected through resistances 136 and 136' and a conductor 137 to the anode of the triode M', and is connected through the resistance 136 and a conductor 138 to the anode of the triode $M^2$. The cathode of triode M' is connected by a conductor 139 to the conductor 10A and the cathode of triode $M^2$ is connected by a conductor 140 to a contact 141 adjustable along a resistance 142 which has one terminal connected to the conductor 10A and has its other terminal connected by conductor 143 to the midpoint of the bridge resistance 5.

The control grid of the triode $M^2$ is connected to the conductor 139 and thereby to the conductor 10A to which contact $H^2$ is directly connected by the conductor 133. Inasmuch as the cathode of triode $M^2$ is connected by conductor 140, contact 141, a portion of resistance 142 and conductor 143 to the midpoint of the instrument resistor 5, the control voltage impressed on the triode $M^2$ is proportional in magnitude to the deviation of the instrument contact $H^2$ from its normal value or control point position. In consequence, the valve $M^2$ operates to make the speed of the reset motor G proportional to the deviation of the controlled quantity from its normal or control point value. The previously described connection from the bridge P to the control grid of the valve M' augments the magnitude of reset motor variation produced by the given deviation of the contact $H^2$, generally as in the construction shown in Fig. 1.

As previously stated, the amplifier triodes $V^7$ and $V^8$ are furnished unidirectional plate current by the rectifier comprising the triode R and condenser 83. The anode of triode $V^7$ is connected through a conductor 145 to the conductor 138 and thereby through the resistance 136 to the positive output terminal of the rectifier. The cathode of the triode $V^7$ is connected through conductors 133 and 10A to the negative terminal of the rectifier. The control grid of the triode $V^7$ is connected through a slider contact 146 to a variable point along the length of a resistance 147. The resistance 147 has its upper end connected by a conductor 148 to the valve motor adjusted contact $D^3$ of the bridge EI. The other terminal of the resistance 147 is connected to the conductor 133 and thereby to the instrument contact $H^2$. The control voltage impressed on the triode $V^7$ is thus dependent in magnitude and direction on the magnitude and direction of the potential difference between the contact $H^2$ and the valve motor or follow-up contact $D^3$.

The anode of the tube $V^8$ is connected to the cathode of the rectifier tube R by a conductor 149 and an inductive winding 150. The cathode of the triode $V^8$ is connected to the conductor 133 through a resistance 151 and a condenser 152 in shunt to said resistance. The control grid of the valve $V^8$ is connected to the anode of the valve $V^7$ through a condenser 153, and is connected to the cathode of tube $V^8$ through resistances 154 and 151 and condenser 152.

The tubes $V^7$ and $V^8$ control the operation of the valve motor D by virtue of the fact that the winding 150 forms the control winding of an inductive regulator 159 associated with amplifying electronic units or duplex tubes $V^9$ and $V^{10}$, which directly control the relays JB' and $JB^2$.

Each of the tubes $V^9$ and $V^{10}$ is shown as a duplex rectifier-beam power amplifier tube of the 117N7–GT type, including inversely connected valves $a$ and $a'$. The valve $a$ is a tetrode comprising an anode, a cathode with beam extension plates, a screen grid and a control grid. The valve $a'$ is a diode. The cathodes of all of the valves are filament heated. The cathodes of the two tetrode valves $a$ and the anodes of the diode valves $a'$ of the tubes $V^9$ and $V^{10}$ are all connected to a conductor 160 and the latter is connected by a conductor 161 to the alternating current supply conductor L2.

The tetrode anode and the diode cathode of tube $V^9$ are each connected to one terminal of a condenser 162, which has its other terminal connected by the winding of relay JB' to a conductor 163 and thereby to the supply conductor L'. The tetrode anode and the diode cathode of the valve $V^{10}$ are connected to one terminal of a condenser 162' which has its second terminal connected through the winding of relay $JB^2$ to the conductor 163 and thereby to the supply conductor L'. The tetrode control grid of the valve $V^9$ is connected by a conductor 164, resistance 165 and condenser 166 in shunt to that resistance, to one end of an inductive winding 167. The winding 167 forms a part of regulator or transformer 159 and current flow through the regulator winding 150 induces current in the winding 167 dependent in magnitude and phase on the current flow in winding 150. The opposite terminal of the winding 167 is connected to the tetrode control grid of valve $V^{10}$ by a conductor 168, a resistance 169 and condenser 170 in shunt to that resistance. A center tap 171 of the winding 167 is connected to the conductor 160 by a resistance 172 and condenser 173 in shunt to that resistance.

A half wave rectifier tube 175 impresses a bias potential on the input circuits of the tetrode valves $a$. As shown, the valve 175 has its cathode connected to the supply conductor L1 through a conductor 176 and has its anode connected to the supply conductor L2 by a condenser 177. The anode of the valve 175 is also connected through a resistance 177' to the center tap 171 of winding 167.

Each of the two windings 17 and 18 of the motor D has one terminal connected to the supply conductor L2 through the conductor 161. The second terminal of the field winding 17 is connected through a switch member 182 to the common terminal of the windings of the relays $JB'$ and $JB^2$ when the winding $JB'$ is energized and closes the switch 182. The second terminal of the winding 18 of the motor D is connected to a switch member 183 and is thereby connected to the common terminal of the windings of relays $JB'$ and $JB^2$ when the winding $JB^2$ is energized and moves the switch 183 into its closed position.

In operation current flow through winding 150 of the regulator 159 induces current flow in the winding 167 which is in phase with the voltage of the supply conductors L1 and L2 or is 180° out of phase with the last mentioned voltage, accordingly as the current flow in the winding 150 results from a displacement of the instrument contact $H^2$ of bridge E1 to the high or to the low side of the normal or control point position of said contact. When the voltage induced in the winding 167 is in phase with the voltage between the supply conductors L1 and L2 it makes the control grid of one of the associated valves $a$ less negative relative to the cathode of the valve and thus makes the tube $V^9$ or $V^{10}$, containing that valve operatively conductive, whereby the winding of the relay $JB'$ or $JB^2$ is energized and the relay switch 182 or 183 is closed.

Each of the tubes $V^9$ and $V^{10}$ with its inversely connected diode and tetrode valves, and associated condenser 162 or 162', relay $JB'$ or $JB^2$ and means for impressing a control voltage on the input circuit of its tetrode valve on changes in the value of a control condition forms a combination embodying an invention made by me and disclosed and claimed in my prior application Serial No. 541,576, filed June 22, 1944. That combination is characterized by the fact that while the tetrode valve is maintained operatively conductive by its control grid, full wave energization of the relay $JB'$ is maintained. In the operation of said combination, the potential of the condenser 162 built up by the conduction of the valve $a$ during its half cycle of line power operation controls the conduction of the diode valve $a^1$ during its half cycle of line power actuation, so that the full wave current supply to the relay $JB'$ is controlled by controlling the conduction of the tetrode valve $a$ of the tube $V^9$, although that valve operates only during one-half of the full wave current cycle.

The closure of the switch 182 of Fig. 2 energizes the winding 17 of the motor D and sets the latter into operation in the direction to give an opening adjustment to the valve C and a clockwise adjustment to the contact $D^3$. Normally, the operation of the motor D, so initiated, continues until the bridge circuit E1 is rebalanced, at least temporarily. When the phase of the voltage induced in the winding 167 is 180° out of phase with the supply voltage as a result of a displacement of the instrument contact $H^2$ counter-clockwise from its normal position the valve $a$ of the tube $V^{10}$ is made operatively conductive and the resultant energization of the relay winding $JB^2$ closes the switch 183 and energizes the field winding 18 of the motor D. The latter then turns in the direction to give a closing adjustment to the valve C and to adjust the contact $D^3$ of the bridge E1 in the counter-clockwise direction.

The creation of an operative current flow through the control winding 150 results from the impression of a signal voltage on the input circuit of the valve $V^7$. That signal voltage is in phase with or 180° out of phase with the supply voltage between supply conductors L1 and L2, on the assumption made above, accordingly as the contact $H^2$ is displaced clockwise or counter-clockwise from its neutral position. Since the tubes $V^7$ and $V^8$ are energized by unidirectional current, the phase of the pulsating current flow through the winding 150 is dependent on and varies with the phase of the signal voltage impressed on the input circuit of tube $V^7$.

The motor D is operated not only in direct response to the adjustment of the instrument contact $H^2$ but also as a direct result of the operation of the reset motor G which increases or decreases the resistance 2A in circuit while simultaneously decreasing or increasing the resistance 2B in circuit. The extent and speed of operation of the reset motor G of Fig. 2 is dependent on the direction and extent of displacement of the contact $H^2$ from its neutral position and the resultant change in the signal voltage impressed on the input circuit of the tube $M'$, in the same general manner as in the arrangement shown in Fig. 1. The reset motor G of Fig. 2 operates continuously so long as the contact $H^2$ is displaced from its neutral position. Operation of the motor D necessary to compensate for the bridge unbalancing action of the motor G is relatively slow and in practice will be in intermittent steps at least in the final stage of attaining balance. In each of such intermittent steps complete balance is temporarily approximated.

The operation of the motor D as a result of the energization of one of the relays $JB'$ or $JB^2$ is interrupted as a result of the deenergization of that relay, prior to complete balancing of the bridge circuit E1, as is desirable to minimize hunting risk. Such deenergization of the relay motor prior to the attainment of complete balancing results from the parallel connected resistance and condenser 165 and 166, or 169 and 170, in the grid circuit of the tube $V^9$ or $V^{10}$ controlling the energization of the corresponding relay. This effect of the parallel connected resistance and condenser in the grid circuit of the tube controlling the relay deenergized results from grid rectification and the potential drop thereby produced across the corresponding parallel connecting resistance and condenser. Such potential drop makes the corresponding controlled grid more negative relative to the associated cathode and thus causes the tube $V^9$ or $V^{10}$ to be rendered non-conductive prior to the time when it would become non-conductive if the parallel connected resistance and condenser were not provided.

The operative effect of the parallel resistance and conductor in the grid circuit of each of tubes $V^9$ and $V^{10}$ contributes to the attainment of complete final balance in a series of short steps, and such short steps tend directly to the avoidance of hunting, notwithstanding the fact that the energization of the motor is effected through simple relays having inertia, instead of by the more expensive expedient of including the control windings of the motor in the output circuits of electronic control tubes. As shown diagrammatically in Fig. 2 the relay JB' and JB$^2$ are conventional open contact, electromagnetic relays. The relays used may take varying forms however, and in many cases use may advantageously be made of the special form of mercury switch relay disclosed in my said prior application Serial No. 541,576.

Figure 3:
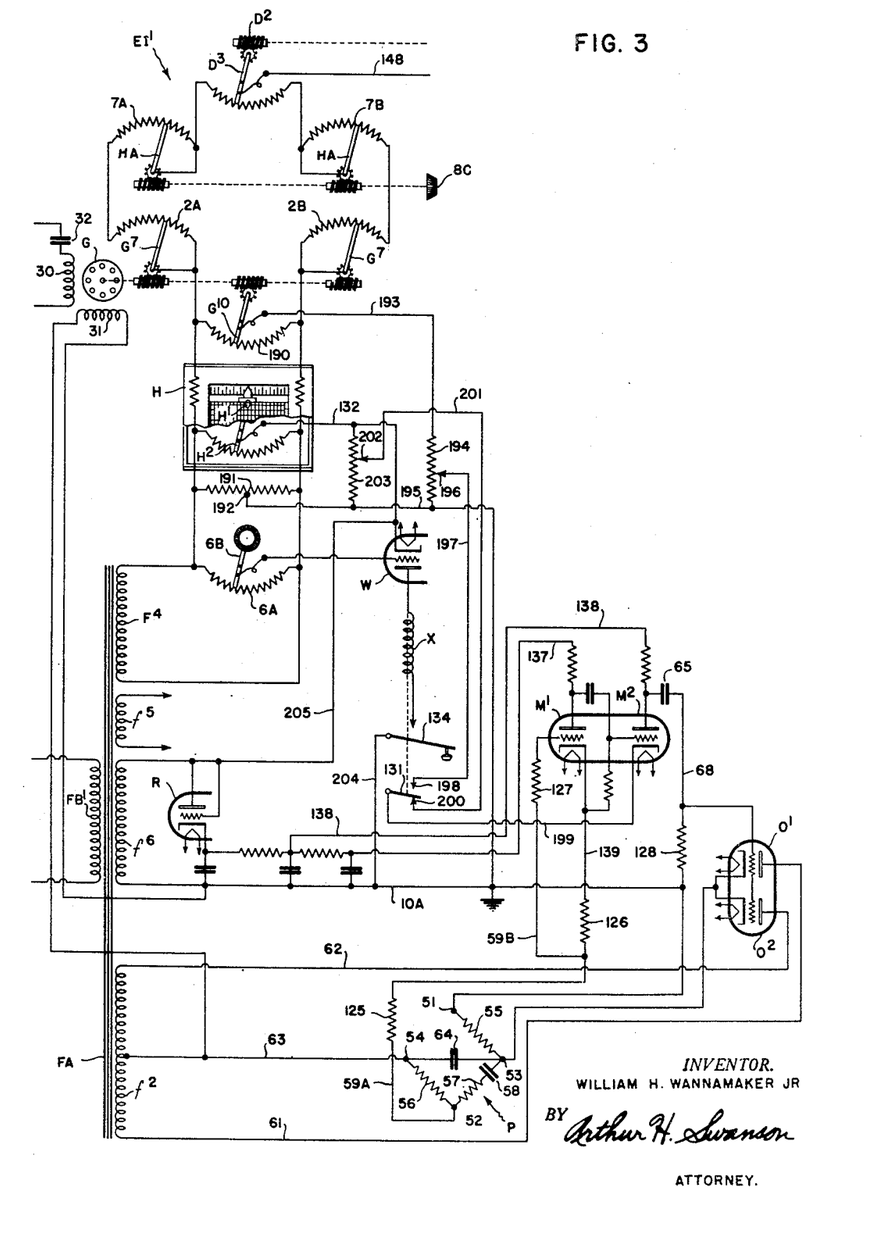

In Fig. 3 I have illustrated a modification of the apparatus shown in Fig. 2 in which the reset motor is automatically energized as required to move the reset rheostat arms $G^7$ into their mid or center positions while the furnace temperature is being brought up to the control point value in an initial stage of furnace operation. Such action of the reset motor is obtained by means comprising an additional slide wire resistance 190 in the bridge circuit EI' and an associated slider contact $G^{10}$ adjusted by the reset motor G through a worm and gear connection. In addition the circuit shown in Fig. 3 includes means for effecting the rheostat centering operation of the motor G by means responsive to the difference between the potentials of the contact $G^{10}$ and the mid point 192 of a resistance 191 included in the bridge circuit EI' in parallel with the resistance 190. As shown, the contact $G^{10}$ is connected by a conductor 193 to a resistance 194. The latter has one end connected to the point 192 of the resistance 191, and has its other end connected through conductor 195 to the grounded conductor 10A.

A slider contact 196 in engagement with and adjustable along the resistance 194 is connected by a conductor 197 to the upper or front contact 198 associated with the switch member 131. In its relation to the switch 131, the conductor 197 of Fig. 3 replaces the conductor 129 of Fig. 2. In Fig. 3, the switch member 131 is directly connected by a conductor 199 to the cathode of the amplifier triode $M^2$. The back or lower contact 200 associated with the switch member 131 of Fig. 3, is connected by a conductor 201 to a slider contact 202 engaging and adjustable along a resistance 203. The latter has one end connected to the conductor 132 and thereby to the instrument contact $H^2$, and has its other end connected to the conductor 195 connecting point 192 to conductor 10A. In Fig. 3 the relay winding is energized when switch 134 is elevated by means including a conductor 204 connecting switch 134 to one terminal or transformer secondary winding $f^6$ and a conductor 205 connecting the other terminal of winding $f^6$ to conductor 132.

In the operation of the apparatus shown in Fig. 3, the switch members 131 and 134 are manually moved into their upper position at the beginning of a furnace heating operation. The switch member 134 then completes the plate circuit of the triode W and energizes the hold-in relay X which maintains its switch members 131 and 134 in their upper positions during the initial furnace heating operation as in Fig. 2. With the switch contact 131 in its upper position, the plate circuit of the valve $M^2$ is completed through the conductor 197 and the contact 198 then engaged by the switch member 131. In consequence, the motor G is then conditioned for operation until the potential of the contact $G^{10}$ becomes equal to the potential of the point 192. When the furnace temperature attains its control point value and the resultant adjustment of the instrument contact $H^2$ reduces the control voltage impressed on the input circuit of the tube W, the latter becomes non-conductive and the relay X is deenergized. The subsequent normal operation of the apparatus shown in Fig. 3 is the same as that of the apparatus shown in Fig. 2.

Figure 4:
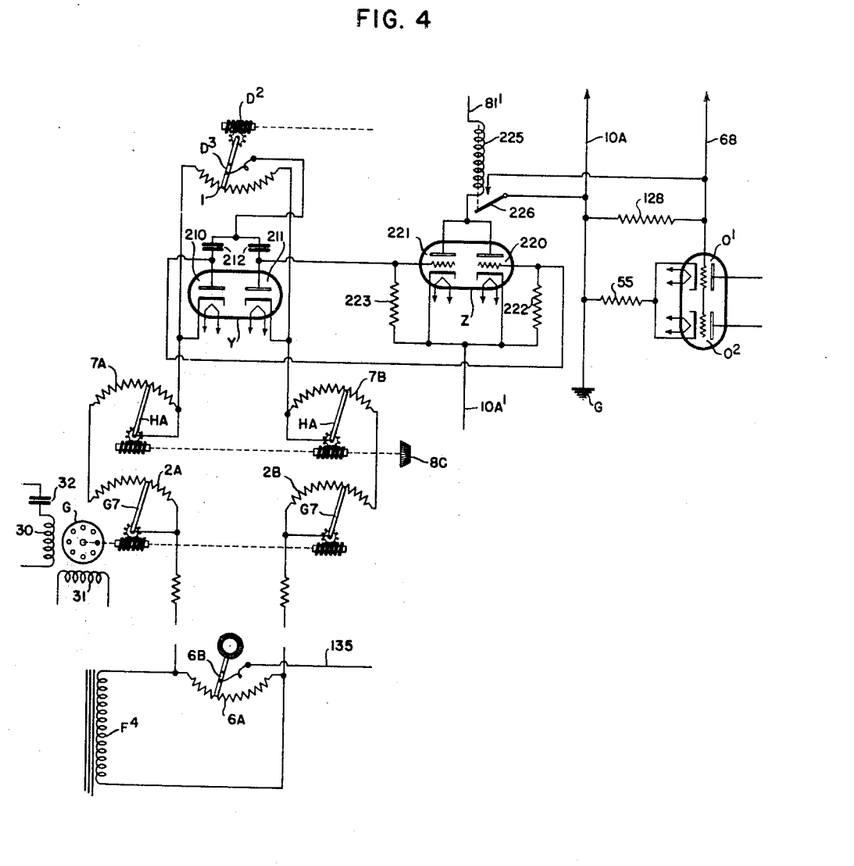
Fig. 4 is a diagrammatic illustration of a modification of a portion of the apparatus shown in Fig. 2.

In Fig. 4 I have illustrated a modification of the apparatus shown in Fig. 2 including means for stopping the reset action whenever the control valve C reaches either limit of its adjustment range. The means provided for this purpose comprise a full wave rectifier Y for deriving two D. C. voltages which vary inversely as the valve C approaches either limit of its movement and the contact $D^3$ approaches one end or the other of the bridge resistance I. The rectifier Y is shown as comprising a duplex tube including two diode valves 210 and 211 each having its anode connected through a separate condenser 212 to the contact $D^3$. The two D. C. voltages derived by the rectifier Y are respectively impressed on the input circuits of triodes 220 and 221 included in a duplex tube Z. As shown, the anodes of the valves 210 and 211 are respectively connected directly to the control grids of the triodes 220 and 221. The cathode and control grid of valve 220 are connected by a resistance 222 and a resistance 223 connects the cathode and control grid of valve 221. The two valves 220 and 221 have a common output circuit which includes a relay winding 225 and some suitable source of direct current. That source may well be the source of direct current supplied to the output circuits of the valves $V^7$ and $V^8$ of Fig. 2, and as shown, the cathodes of the valves 220 and 221 are connected to a branch 10A' of the conductor 10A, and the anodes of the two valves are connected through the winding 225 to a branch 81' of the conductor 81 of Fig. 2.

When the contact D of Fig. 4 turns clockwise to the limit of its movement in that direction, the D. C. voltage transmitted to the control grid of valve 220 attains its maximum value and makes that valve sufficiently conductive to energize the relay 225 and closes the switch 226. This closes a short circuit about the resistance 128 and thereby by-passes any signal voltage which might otherwise be impressed on the input circuits of the reset motor driving stage valves O' and $O^2$. When thereafter the contact $D^3$ moves counter-clockwise away from the left end of the resistance I as seen in Fig. 4, the relay 225 ceases to be operatively energized and the switch 226 opens and the tubes O' and $O^2$ again become operative to control operation of the reset motor. When the contact $D^3$ reaches the limit of its movement in the counter-clockwise position, the D. C. voltage impressed on the grid of the valve 221 rises to the value at which the valve 221 is sufficiently conductive to energize the relay 225 and thereby make it impossible for the valves O' and $O_2$ to effect operation of the reset motor G. When thereafter the contact $D^3$ moves away from the right end of the resistance I, the relay switch 226 opens and the valves O' and $O^2$ again become operative to control the operation of the motor G.

In all its forms illustrated herein my improved electric proportioning apparatus is characterized by the relatively simple and inexpensive apparatus used to effect proportional control with automatic reset proportional in extent and rate to the extent of departure of the control condition from its normal or control point value. The invention is characterized in particular by its provisions for avoiding over-travel of the valve motor while controlling the operation of the latter by relays which may be of conventional electromagnetic type, and which are energized by means including electronic valves for amplifying relatively minute control voltages. The invention is further characterized by the simple and effective manner in which the speed of the reset motor is varied through a wide range in response to a control voltage variation through a small range. The invention is characterized also by the provisions for preventing the operation of the reset motor under a condition in which the reset action would otherwise pile up disadvantageously, coupled with automatic provisions for rendering the reset motor operative when the operating condition changes. The invention is further characterized by its provisions through which the reset motor is prevented from causing over-travel of the contact which it adjusts.

The invention in characterized also, by the fact that the control circuit network may be readily modified as conditions make desirable, without interfering with the ready attainment of the general advantages and operating features of the invention. Thus, for example, the circuit network may comprise two main bridge circuits E and I as shown in Fig. 1, or a single main bridge circuit EI as shown in Fig. 2. Note that in Fig. 2 the reset resistance 2 of Fig. 1 is in effect divided into two sections 2A and 2B, with a separate contact G⁷ cooperating with each of the sections 2A and 2B, generally as the contact G² cooperates with the resistance 2 in Fig. 1.

As will be apparent to those skilled in the art the invention disclosed and claimed herein has numerous desirable characteristics and capacities, and while in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. An electric proportioning control apparatus comprising in combination a controlled device, first, second and third resistances, a separate slider contact engaging and adjustable along each of said resistances, a fourth resistance, connecting means adapted to connect each of said resistances to a source of alternating current, a reversible electric control motor for adjusting said device and for simultaneously adjusting the contact engaging said first resistance, a reversible electric reset motor for adjusting the contact engaging the second resistance, means adjusting the contact engaging the third resistance in accordance with variations in a control condition, means responsive to a difference in potential between the contact engaging said third resistance and an intermediate point of said fourth resistance arranged to energize said reset motor for operation in the direction to eliminate said potential difference, means connecting an intermediate point of said fourth resistance and said contacts in series in a control circuit, energizing means for said control motor comprising two relay switches each including a separate winding and arranged to energize said control motor for operation in one direction or in the opposite direction accordingly as one or the other of said relay windings is energized, relay energizing triodes each having an input circuit and an output circuit, one of said windings being included in one, and the other winding being included in the second of said output circuits, electronic amplifying means actuated by current flow in said control circuit, coupling means between said amplifier and the input circuits of said triodes for effecting energization of one or the other of said windings, on a current flow in said control circuit, as required for operation of the control motor in a direction to eliminate said current flow, and means included in said coupling means comprising a separate resistance and an associated condenser connected to each input circuit and cooperating when a control circuit current flow which has resulted in the energization of the corresponding relay winding is being reduced, to effect deenergization of that winding prior to the total elimination of said current flow.

2. An electric proportioning control apparatus comprising in combination, a control device, a circuit network, means for connecting said network to a source of alternating current, said network comprising first, second and third resistances and a separate slider contact engaging and adjustable along each of said resistances and also comprising a fourth resistance, each of said resistances having its terminals connected to points in said network between which a potential difference exists when the network is connected to said source, a reversible electric control motor for adjusting said device and for simultaneously adjusting the contact engaging said first resistance, a reversible electric reset motor for adjusting the contact engaging the second resistance, means adjusting the contact engaging the third resistance in accordance with variations in the value of a control quantity, means connecting an intermediate point of said fourth resistance and said three contacts in a control circuit, motor energizing means arranged to be actuated by current flow in said control circuit to energize said control motor for operation in one direction or in the opposite direction as required to eliminate said current flow by adjustment of the contact engaging said first resistance, and motor energizing means actuated by a potential difference between said third contact and an intermediate point of said fourth resistance to energize said reset motor for operation with a speed varying with the magnitude of the last mentioned potential difference and in a direction to eliminate said last mentioned potential difference by adjustment of the slider contact engaging said second resistance, the last mentioned motor energizing means being arranged to be connected to and energized by said source of alternating current and comprising a control winding and electronic amplifying means including an input circuit and an output circuit connected to said control winding and means for impressing on said input circuit a signal voltage produced by said last mentioned potential difference.

3. A control apparatus combination as specified in claim 2, comprising a feed back connection including resistance and capacity from said control winding to the input circuit of said amplifier, arranged to increase the variation in reset motor speed produced by a given variation in said signal voltage impressed on said input circuit.

4. A control apparatus combination as specified in claim 2, in which said reset motor energizing means includes a Hay bridge connected to said control winding and a feed back connection from said Hay bridge to said input circuit arranged to increase the variation in the speed of the reset motor produced by a given change in said signal voltage impressed on said input circuit.

5. A control apparatus combination as specified in claim 2 in which said circuit network comprises a bridge and in which said second resistance is divided into two sections, each including a contact engaging a resistance and in which said sections connect two of the resistances.

6. A control apparatus combination as specified in claim 2, comprising means actuated on the energization and deenergization of said control motor to maintain said reset motor in inoperative and operative conditions, respectively.

7. A control apparatus combination as specified in claim 2, in which said amplifying means comprises motor drive triodes having output circuits connected to said control winding and having an input circuit including an element normally responsive to variations in said signal voltage, and means for making said element non-responsive to said variations when said control motor is in operation.

8. A control apparatus combination as specified in claim 2, including means arranged to maintain said reset motor inoperative while the slider contact engaging said third resistance is at one side of a predetermined position and to make said reset motor operative on movement of said contact into said predetermined position.

9. A control apparatus combination as specified in claim 2, including means for maintaining said reset motor inoperative while the value of the control quantity is within a predetermined range comprising a control element manually adjustable into a position in which it prevents operation of said reset motor, and means actuated by said third contact to move said element out of said position on movement of said contact from a position corresponding to a value of said quantity within said range to a position corresponding to a value of said quantity outside of said range.

10. In a control apparatus, an electrical network, means to control an electrical characteristic of said network in response to a condition change, control means responsive to a change in said characteristic produced by a condition change to control said condition in the direction to counteract said condition change, follow-up means responsive to a change in said characteristic to control said electrical network to change said characteristic in the direction and to an extent to at least partially neutralize the first mentioned characteristic change, and reset means including a reversible motor arranged to adjust said network to alter said characteristic at a rate depending upon the speed of rotation of said motor and also including motor energizing means responsive to the direction and magnitude of the condition change and including a Hay bridge to energize said motor for rotation at a speed varying through a wide range with the magnitude of said condition change and in the direction to produce a further characteristic change in the same direction as the characteristic change produced by said follow-up means.

11. In a control apparatus, an electrical network, means to control an electrical characteristic of said network in response to a condition change, control means responsive to a change in said characteristic produced by a condition change to control said condition in the direction to counteract said condition change, follow-up means responsive to a change in said characteristic to control said electrical network to change said characteristic in the direction and to an extent to at last partially neutralize the first mentioned characteristic change, reset means including a reversible motor arranged to adjust said network to alter said characteristic at a rate depending upon the speed of rotation of said motor and also including means responsive to the direction and magnitude of the condition change to energize said motor for rotation at a speed varying with the magnitude of said condition change and in the direction to produce a further characteristic change in the same direction as the characteristic change produced by said follow-up means, a control device manually adjustable to render said reset motor inoperative, and means responsive to the magnitude of said condition to readjust said device and render said reset motor operative when the magnitude of said condition attains a predetermined value.

12. In a control apparatus, an electrical network, means to control an electrical characteristic of said network in response to a condition change, control means responsive to a change in said characteristic produced by a condition change to control said condition in the direction to counteract said condition change, follow-up means responsive to a change in said characteristic to control said electrical network to change said characteristic in the direction and to an extent to at least partially neutralize the first mentioned characteristic change, and reset means including a reversible motor arranged to adjust said network to alter said characteristic at a rate depending upon the speed of rotation of said motor and also including a motor energizing circuit responsive to the direction and magnitude of the condition change and including a device responsive to the speed of said motor and operative to produce an electrical output of a magnitude dependent upon the speed of said motor, and connections operative to apply said output to said motor energizing circuit, whereby the latter is operative to energize said motor for continuous rotation at a speed varying through a wide range as a function of the departure of said condition from a predetermined, normal value as long as said condition is departed from said value, and in the direction to produce a further characteristic change in the same direction as the characteristic change produced by said follow-up means.

13. An electric proportioning control apparatus comprising in combination, a control device, a circuit network, means for connecting said network to a source of alternating current, said network including first, second, and third impedance elements, each having a pair of end terminals and an intermediate terminal adjustable in potential with respect to the associated end terminals, and also including a fourth impedance element having a pair of end terminals and an intermediate terminal, each of said impedance elements having its end terminals connected to points in said network between which a potential difference exists when said network is connected to said source, a reversible electric control motor for adjusting said device and for simultaneously adjusting the potential of the intermediate terminal of said first impedance element, a reversible electric reset motor for adjusting the potential of the intermediate terminal of said second impedance element, means adjusting the potential of the intermediate terminal of said third impedance element in accordance with variations in the value of a control quantity, means connecting the intermediate terminal of each of said impedance elements in a control circuit, motor energizing means arranged to be actuated by current flow in said control circuit to energize said control motor for operation in one direction or in the opposite direction as required to eliminate said current flow by adjustment of the potential of the intermediate terminal of said first impedance element, and motor energizing means actuated by a potential difference between the intermediate terminals of said third and fourth impedance elements to energize said reset motor for operation at a speed varying with the magnitude of the last mentioned potential difference and in a direction to eliminate said last mentioned potential difference by adjustment of the potential of the intermediate terminal of said second impedance element, the last mentioned motor energizing means being arranged to be connected to and energized by said source of alternating current and comprising a control winding and electronic amplifying means including an input circuit and an output circuit connected to said control winding and means for impressing on said input circuit a signal voltage produced by said last mentioned potential difference.

14. An electric proportioning control apparatus comprising in combination, a control device, a circuit network, means for connecting said network to a source of electrical current, said network including first, second, and third impedance elements, each having a pair of end terminals and an intermediate terminal adjustable in potential with respect to the associated end terminals, and also including a fourth impedance element having a pair of end terminals and an intermediate terminal, each of said impedance elements having its end terminals connected to points in said network between which a potential difference exists when said network is connected to said source, a reversible electric control motor for adjusting said device and for simultaneously adjusting the potential of the intermediate terminal of said first impedance element, a reversible electric reset motor for adjusting the potential of the intermediate terminal of said second impedance element, means adjusting the potential of the intermediate terminal of said third impedance element in accordance with variations in the value of a control quantity, means connecting the intermediate terminal of each of said impedance elements in a control circuit, motor energizing means arranged to be actuated by current flow in said control circuit to energize said control motor for operation in one direction or in the opposite direction as required to eliminate said current flow by adjustment of the potential of the intermediate terminal of said first impedance element, and motor energizing means actuated by a potential difference between the intermediate terminals of said third and fourth impedance elements to energize said reset motor for operation at a speed varying with the magnitude of the last mentioned potential difference and in a direction to eliminate said last mentioned potential difference by adjustment of the potential of the intermediate terminal of said second impedance element, the last mentioned motor energizing means being arranged to be connected to and energized by said source of electrical current and comprising a control winding and amplifying means including an input circuit and an output circuit connected to said control winding and means for impressing on said input circuit a signal voltage produced by said last mentioned potential difference.

WILLIAM H. WANNAMAKER, JR.

REFERENCES CITED

The following references are of record in the file of this patent:

UNITED STATES PATENTS

| Number | Name | Date |
|---|---|---|
| 2,208,762 | Hartig et al. | July 23, 1940 |
| 2,334,537 | Brown et al. | Nov. 16, 1943 |
| 2,376,513 | Shaffer | May 22, 1945 |
| 2,390,793 | Jones | Dec. 11, 1945 |